United States Patent
Satake et al.

(10) Patent No.: US 6,173,619 B1
(45) Date of Patent: Jan. 16, 2001

(54) METHOD AND DEVICE FOR EFFECTING TEMPERATURE COMPENSATION IN LOAD CELL TYPE LOAD DETECTOR

(75) Inventors: Satoru Satake, Tokyo; Hiroki Maeda, Hiroshima, both of (JP)

(73) Assignee: Satake Corporation, Tokyo (JP)

( * ) Notice: Under 35 U.S.C. 154(b), the term of this patent shall be extended for 0 days.

(21) Appl. No.: 08/982,376

(22) Filed: Dec. 2, 1997

(30) Foreign Application Priority Data

Dec. 5, 1996 (JP) .................................................. 8-342654
Oct. 24, 1997 (JP) .................................................. 9-309581

(51) Int. Cl.$^7$ ...................................................... G01L 1/04
(52) U.S. Cl. ........................................................ 73/862.622
(58) Field of Search .................... 73/862.622, 862.63, 73/862.624; 177/136, 210

(56) References Cited

U.S. PATENT DOCUMENTS

| | | |
|---|---|---|
| 4,198,868 | 4/1980 | Runyan . |
| 4,365,520 | 12/1982 | Zaghi . |
| 4,592,665 | 6/1986 | Wheable . |
| 5,850,057 | * 12/1998 | Veillette ................... 177/212 |
| 5,894,112 | * 4/1999 | Kroll ....................... 177/134 |
| 5,922,998 | * 7/1999 | Zefira ....................... 177/136 |
| 5,929,390 | * 7/1999 | Naito et al. ............... 177/211 |
| 5,932,848 | * 8/1999 | Gordon .................... 177/210 |
| 5,950,573 | * 9/1999 | Shellenberger et al. ..... 122/448 |

FOREIGN PATENT DOCUMENTS

| | | |
|---|---|---|
| 19501231 | 7/1996 | (DE) . |
| 0702220 | 3/1996 | (EP) . |
| 54-55474 | 5/1979 | (JP) . |
| 1-152317 | 6/1989 | (JP) . |
| 1152317 | 6/1989 | (JP) . |
| 1318932 | 12/1989 | (JP) . |

* cited by examiner

Primary Examiner—Benjamin R. Fuller
Assistant Examiner—Jewel V. Thompson
(74) Attorney, Agent, or Firm—Fish & Richardson, PC

(57) ABSTRACT

The apparatus for effecting temperature compensation in a load cell type load detector is for a load detecting apparatus having a load cell constituting the load detector formed with a strain gauge attached to a deflectable body, a mount base for positioning the load detector, and a load generating section to receive a flow of objects to be measured. The apparatus includes a pair of thermal source blocks provided so as to be directly in contact with the deflectable body and be disposed respectively at two symmetric positions with respect to the center of the load detector, a pair of temperature sensors provided respectively to the thermal source blocks, a controller for controlling thermal elements based on temperatures detected by the temperature sensors such that a temperature of the load cell type load detector may be maintained at a predetermined constant temperature. The method is carried out by controlling a temperature of the load cell type load detector such that the temperature of the load cell type load detector is not affected by environment temperature changes.

10 Claims, 4 Drawing Sheets

POWER SOURCE

METHOD AND DEVICE FOR EFFECTING TEMPERATURE COMPENSATION IN LOAD CELL TYPE LOAD DETECTOR

BACKGROUND OF THE INVENTION

(1) Field of the Invention

The present invention relates to a load detecting apparatus using a load cell type load detector (hereinafter simply referred to as "load cell"), and more particularly to a load detecting apparatus using a load cell in which the temperature compensation is effected for variations of a zero point of the load cell caused by temperature changes.

(2) Description of the Related Art

It has been known that, in a load detecting apparatus using a load cell, the zero point of the load cell varies depending on the temperature changes of the load cell itself caused by changes in an environment temperature. For the compensation of the variations of the zero point caused by the temperature changes, a prior art disclosure is found in each of Japanese Patent Application Kokai Publication No. Sho 54-55474 and Japanese Patent Application Kokai Publication No. Hei 1-152317.

The method with which the measured value is compensated by taking the temperature changes into consideration has a problem in that the method is very complicated. Also, the method in which the influence from temperature changes is attempted to be reduced by adding such an element as a temperature compensation element to a circuit such as a bridge circuit has a problem in that, when there is a large extent of temperature changes, the temperature compensation of the measured values to within a limited value not only involves technical difficulties but also complicates the circuit concerned, thus increasing the cost involved.

The Japanese Patent Application Kokai Publication No. Sho 54-55474 discloses a technique which, with a comparatively simple arrangement and with an object of ensuring to overcome the influence of temperature changes, attempts to maintain a constant temperature of a load cell by providing heat sources and heat sensitive elements in the neighborhood of the periphery of a case of the load cell and controlling temperatures of the heat sources by the heat sensitive elements.

In the arrangement disclosed in the Japanese Patent Application Kokai Publication No. Hei 1-152317 and shown in FIG. 1, the load cell 22 supported on the mounting base is covered by a cover 20 and there are provided a plurality of air conditioning means 21 for adjusting the temperature in the spaces formed by the cover 20 and a plurality of temperature measuring elements 23 for measuring the temperatures of the load cell 22, the mounting base, etc. This technique disclosed in the Japanese Patent Application Kokai Publication No. Hei 1-152317 attempts to realize a load detecting apparatus with which errors caused by a temperature drift is reduced by controlling the air conditioning means 21 such that the respective temperatures measured by the temperature measuring elements 23 become constant. This technique is to prevent the changes in the voltages outputted from the load cell which occur when the temperatures of the load cell are changed in the state wherein the constant load is being applied. The arrangement disclosed in the Japanese Patent Application Kokai Publication No. Hei 1-152317 attempts to prevent the temperature drift by maintaining a constant temperature higher than environment temperature changes in order to eliminate the influence of such environment temperature changes.

In both the above prior art techniques, it is attempted to compensate the changes in the measured values due to the temperature changes by controlling the temperatures of the load cell, and it is made possible to make the compensation only by the temperature control so that the compensation in this way is simpler than the compensation of the measured values themselves as practiced before.

However, in the arrangement disclosed in the Japanese Patent Application Kokai Publication No. Sho 54-55474, it is necessary that the load cell and the strain element which serves as a detecting element for the load cell be positioned in the space surrounded by an outer case, thermal insulating materials, etc. Also, in the arrangement disclosed in the Japanese Patent Application Kokai Publication No. Hei 1-152317, in addition to the necessity to position the load cell in the space surrounded by the cover, it was necessary to provide the air conditioning means. This means that, for purposes of the temperature compensation, a specific load cell must be manufactured so that the cost is high and its use becomes limited. Thus, there was a demand for a temperature compensation technique which provides an arrangement in which a general use load cell can be used as it is and which does not require any special or added installation.

SUMMARY OF THE INVENTION

An object of the invention is to overcome the problems existing in the prior art, and to provide a method and apparatus for effecting temperature compensation in a load cell formed with a strain gauge attached to a deflectable body or a sensing element.

According to one aspect of the invention, there is provided a method for effecting temperature compensation in a load cell type load detector formed with a strain gauge attached to a deflectable body, the method comprising the steps of:

providing a pair of thermally conductive thermal source blocks so as to be directly in contact with the deflectable body and be disposed respectively at two symmetric metric positions with respect to a center of the deflectable able body; and temperature-controlling a temperature of the deflectable able body by the thermal source blocks such that the temperature of the load cell type load detector is not affected by environment temperature changes and is maintained at a constant temperature.

According to a second aspect of the invention, there is provided an apparatus for effecting temperature compensation in a load cell type load detector in a load detecting apparatus having a mount base, a deflectable body provided on the mount base, a strain gauge attached to the deflectable body, and a load generating section for receiving a flow of objects to be measured, the apparatus for effecting temperature compensation comprising:

a pair of thermally conductive thermal source blocks provided so as to be directly in contact with the deflectable body with the thermal source blocks being disposed respectively at two symmetric positions with respect to a center of the deflectable body, and having thermal elements in or on the thermal source blocks; and a pair of temperature sensors provided respectively to the thermal source blocks;

a control means for controlling the thermal elements based on temperatures detected by the temperature sensors such that a temperature of the load cell type load detector may be maintained at a predetermined constant temperature.

Where the thermal source blocks are positioned in symmetric positions with respect to a center portion of the strain gauge attached to the deflectable body of the load call, the deflectable body is heated or cooled by both the symmetrically positioned thermal source blocks so that, because of the internal thermal conduction within the deflectable body, the temperature of the overall load cell, particularly that of the deflectable body having the strain gauge at its center portion, can always be controlled to a constant temperature. Also, by providing the thermal source blocks respectively between load generating portions such as between the deflectable body and a load cell mounting portion and between the deflectable body and a hopper, the thermal conduction (heat radiation) from the deflectable body is only to the ambient air so that no unbalanced heat radiation develops. Because the balance is attained between the heating or cooling by thermal source blocks provided in the symmetric positions and the heat radiation of the heat to the ambient air between the thermal source blocks, it is made possible to control the temperature of the overall load cell to a constant temperature and to provide an apparatus which is easy to handle and low cost.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention are explained with reference to FIGS. 2 to 6. Each of the embodiments covers a load cell of a type in which a deflectable body (sensing element) utilizing a Roberval mechanism is used and to which a strain gauge is attached.

Figure 1:
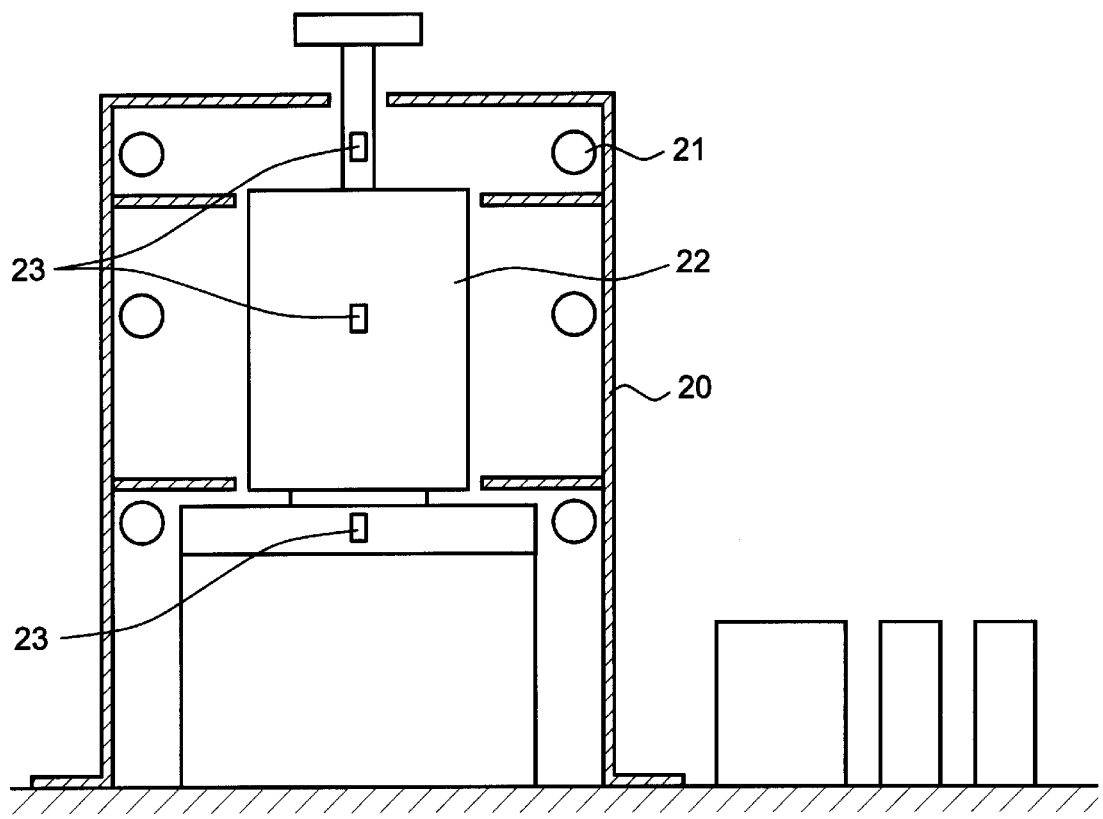
FIG. 1 is a diagram showing a conventional apparatus for effecting temperature compensation in a load cell type load detector.
Figure 2:
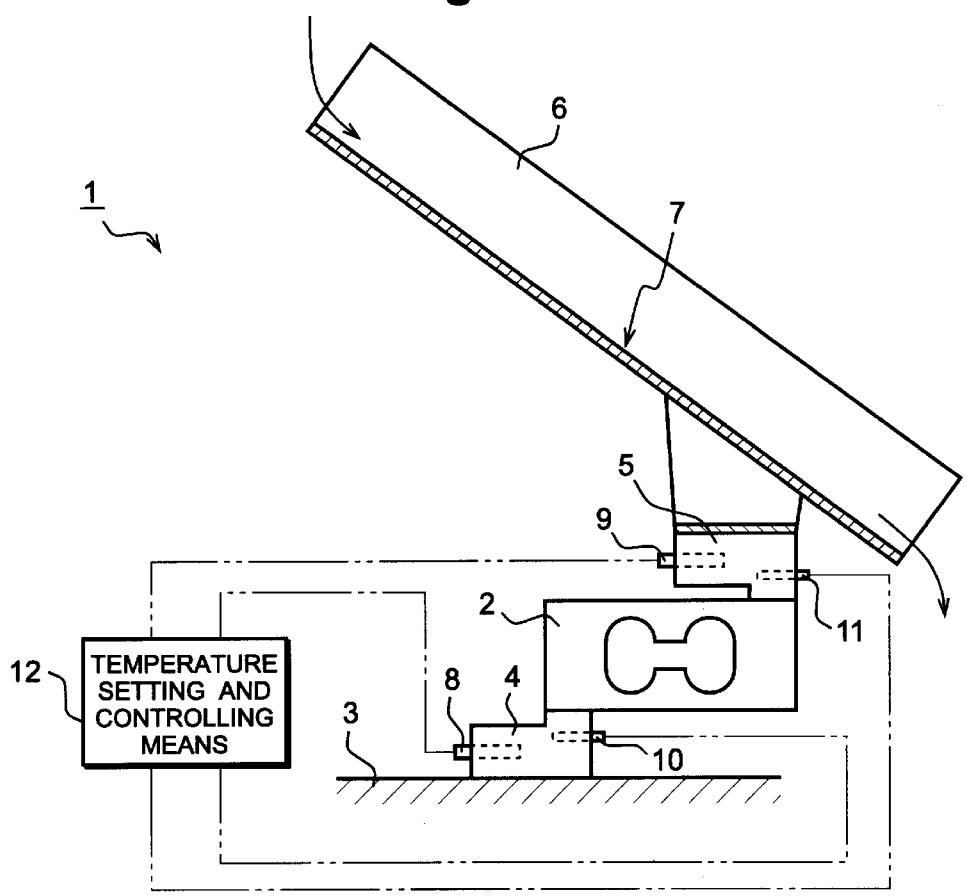
FIG. 2 is a diagram showing a part of a flow meter having an apparatus for effecting temperature compensation in a load cell type load detector according to the invention.

FIG. 2 shows a load cell type load detecting apparatus 1 of a first embodiment of the invention. The load cell 2 has a bottom portion fixed to a mount base 3 with a thermally conductive member 4 being interposed therebetween. Also, a load detecting plate 6 which is a load generating portion is fixed over the load cell 2 with a thermally conductive member 5 of substantially equal mass as the thermally conductive member 4 being interposed therebetween. In other words, the thermally conductive members 4, 5 are fixed respectively at two symmetric positions of the load cell 2, and the thermally conductive members 4, 5 are respectively fixed to the mount base 3 and the load detecting plate 6.

The embodiment illustrated covers the main portion of an arrangement of a flow meter in which the objects being measured flow on an inclined surface 7 of the load detecting plate 6, the load on the inclined surface is detected by the load cell 2, and the load is converted to a flow rate of the objects.

The thermally conductive members 4, 5 are respectively provided with heaters 8, 9 as thermal elements and temperature sensors 10, 11. The heaters 8, 9 and the temperature sensors 10, 11 are connected to a temperature setting and controlling means 12. The temperature setting and controlling means 12 compares the values (temperature) detected by the temperature sensors 10, 11 with the target values (temperature) set in advance, and, for example, the electric current to be supplied to the heaters 8, 9 is controlled so as to eliminate a difference between the temperature values.

As for the heaters 8, 9, any heaters as long as they efficiently heat the thermally conductive members 4, 5 are acceptable so that any heaters best suited and available at the time when the invention is put into practice may be selected. As for the temperature sensors 10, 11, the most commonly used ones are thermistors, but the use is not limited to the thermistors as long as they are capable of outputting signals as the measured values of the temperatures and are preferably compact. Or, they may be detecting elements that are attached to the deflectable body. The thermally conductive members 4, 5 should preferably have a large thermally capacity though being compact, and preferably they are capable of heating the load cell 2 with the heat from the heaters 8, 9 being retained for a long period of time. Thus, the thermally conductive members 4, 5 have functions as thermal sources. If the thermally conductive members 4, 5 are such that they suit to the thermal sources and have strength to endure the load, they may be metal, or may be of a material such as ceramic.

Figure 3:
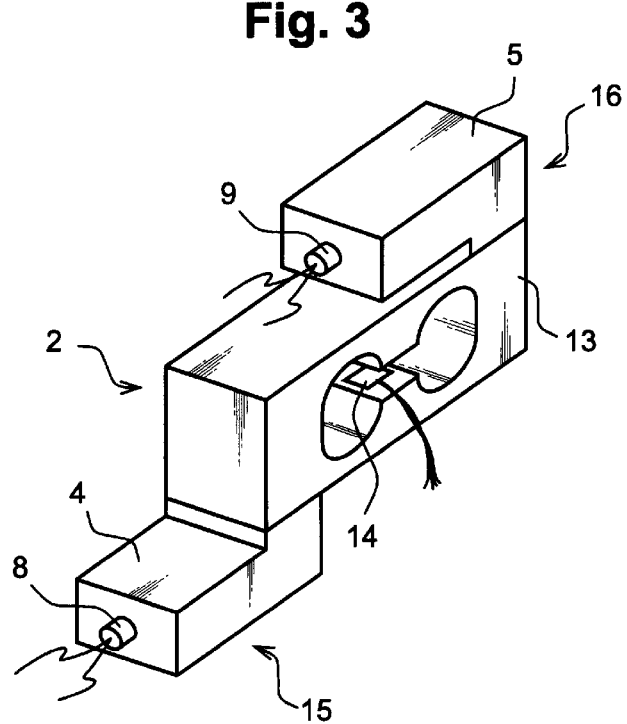
FIG. 3 is a diagram showing an apparatus for effecting temperature compensation in a load cell type load detector as a first embodiment according to the invention.

FIG. 3 shows in detail an apparatus for temperature compensation in a load cell 2, the apparatus consisting of a deflectable body 13 and a strain gauge 14. With the strain gauge 14 attached to the deflectable body 13 being approximately at the center (to be more precise, the center being a center portion of the hollow portion of the load cell), a thermal source block 15 consisting of a thermally conductive member 4 and a heater 8 and a thermal source block 16 consisting of a thermally conductive member 5 and a heater 9 are provided at symmetric positions of the deflectable body 13. The deflectable body 13 is heated from both the thermal source blocks 15, 16 disposed at the symmetric positions and, because of the thermal conduction within the deflectable body 13, the temperature of the overall load cell 2, particularly the deflectable body 13 having the strain gauge 14 substantially at its center, can always be maintained at a constant temperature. Further, since it has been so arranged that there is no heat conduction by the thermal source blocks 15, 16 from the deflectable body to any portions other than the deflectable body 13, that is, to portions such as the mount base 3 and the load detecting plate 6, so that the thermal conduction (heat radiation) is restricted only to the ambient air. Since it has been made possible to avoid the direct contact between the deflectable body 13 and any load generating portions such as the mount base and the hopper, there develops no unbalanced heat radiation from the deflectable body 13. That is, because of the simultaneous heating by the thermal source blocks provided at symmetrical positions of the load cell 2 and of the balance of the heat radiation to the ambient air from the load cell 2 between the thermal sources, the overall temperature of the load cell 2 having the strain gauge 14 at its center can be maintained at a constant value.

This embodiment of the invention is directed to an example wherein, as shown in FIG. 2, a single point load cell is used, and the hollow portion at a center portion of the load cell is constricted. Assuming that there is provided only one thermal source block, the temperature of the deflectable body at the side where the thermal source block exists becomes high while, with the constricted portion as a dividing boundary, the temperature at the side where the thermal source block is not present becomes low. Thus, the provision of such a thermal source block causes the internal temperature of the deflectable body to be unbalanced. This is the most inappropriate state in conditions for using the load cell. Therefore, it is important that, for achieving the balanced temperatures within the deflectable body, the thermally conductive members of substantially equal masses be provided respectively to the two end portions of the load cell and be used as the thermal sources.

Now, the controlling of the temperature of the load cell is explained. The range of the compensation environment temperatures of an ordinary single point load cell is from −10° C. to 40° C. and the estimated range of temperatures used in the load cell is from 0° C. to 35° C. Here, it is possible to control the temperature of the load cell to an appropriate temperature by using a thermal source means, but in the case where, for example, the controlled temperature of the load cell is set to higher than the range of temperatures used in the load cell and to an upper limit 40° C. of the range of the compensation environment temperature of the load cell, the temperature control may be by way of only heating. On the other hand, in the case where, for example, the controlled temperature of the load cell is set to lower than the range of temperatures used and to a lower limit −10° C. of the range of the compensation environment temperature of the load cell, the temperature control may be by way of only cooling. As the heating means, a heater may be used while, as the cooling means, a Peltier element may be used. In this way, the apparatus does not require a large installation as required in the prior art, and the desired temperature compensation can be carried out at low cost.

Figure 4:
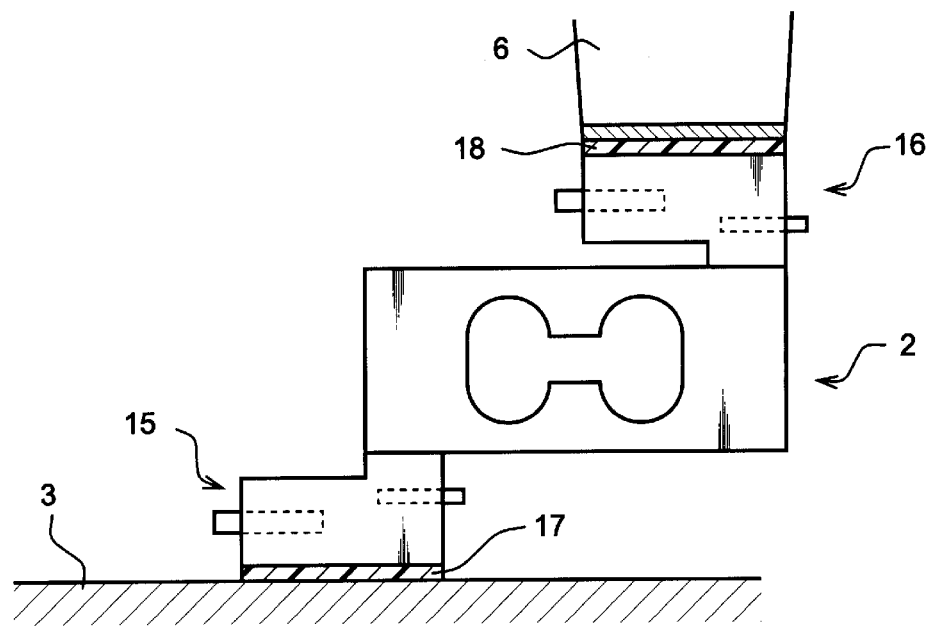
FIG. 4 is a diagram showing an apparatus for effecting temperature compensation in a load cell type load detector as a second embodiment according to the invention.

FIG. 4 shows an apparatus for effecting temperature compensation in the load cell as a second embodiment of the invention. In this embodiment, the difference from the first embodiment is that thermal insulating members 17, 18 are used. In other respects, the arrangements are the same as those in the first embodiment so that the same explanation is not repeated here.

As shown, the thermal insulating members 17, 18 are interposed respectively between the thermal source block 15 and the mount base 3 and between the thermal source block 16 and the load detecting plate 6. In this embodiment, since the thermal insulating members 17, 18 are provided, the heat generated by the thermal source blocks 15, 16 is not conducted to the mount base 3 and the load detecting plate 6, and the thermal source blocks 15, 16 are ensured to heat only the load cell 2 and the heat loss is reduced. As a result, it is possible to make a rapid temperature control of the load cell and to enhance the precision of the temperature control.

Figure 5:
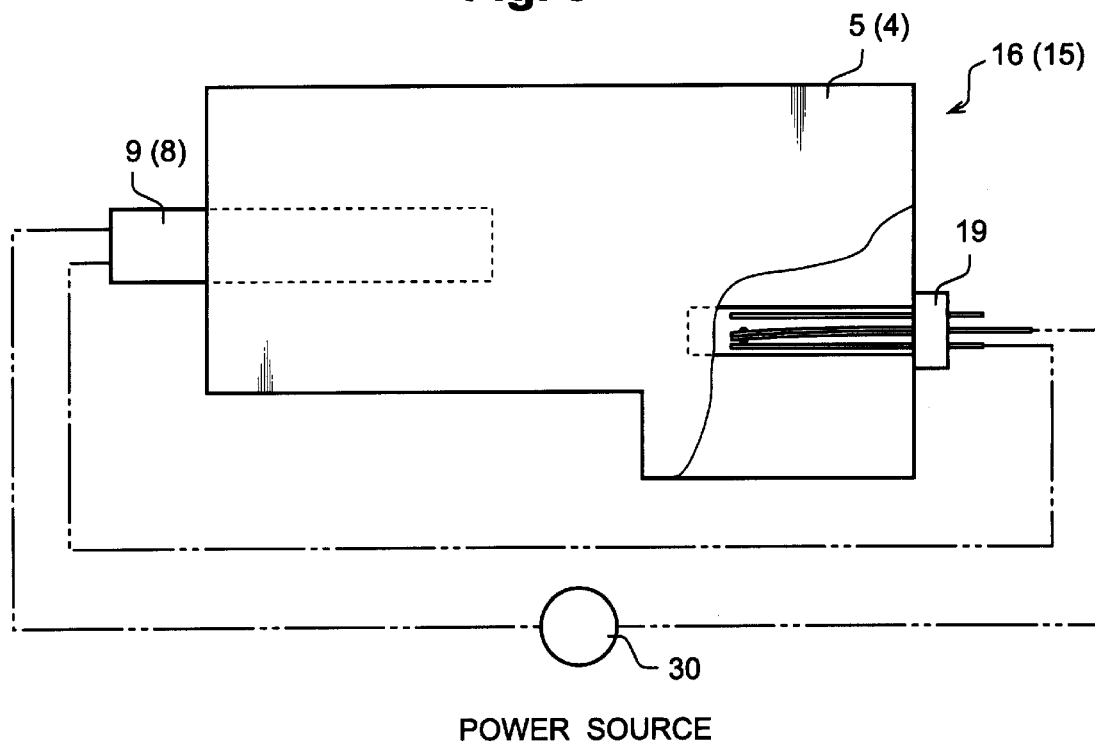
FIG. 5 is a diagram showing an example of the temperature controlling means used in the apparatus according to the invention.

FIG. 5 shows an example of most simple configuration of a temperature setting and controlling means which is used in the temperature compensation apparatus according to the invention and in which a bimetal switch is used. Specifically, the bimetal switch 19 is provided within the thermally conductive members 5(4) and is connected in series with a heater 9(8) as a heating means and a power source 30. Where the bimetal switch 19 in which the operation temperature is 40° C. is used, when the temperature of the thermal source block 16(15) reaches 40° C., the bimetal switch 19 turns OFF, and the heating by the heater 9(8) is stopped. Then, as the temperature of the heat source is lowered, the bimetal switch 19 turns ON, and the heater 9 begins to heat the thermally conductive member 5(4) again. Where the bimetal switch is used, as explained above, the temperature control is made by a repeated intermittent supply of the electric current to the heater 9(8), but since the thermally conductive members 4, 5 themselves are masses having a large thermal capacity, no problem is presented in the maintenance of a constant temperature of the load cell 2 to be heated. Although it depends on the necessity of the measuring precision and the magnitude of changes in the environment temperatures of the environments in which the control is made, the above explained simple temperature controlling means can be practically used and the cost can be considerably reduced. As for the temperature controlling means of this type, besides the bimetal switch, it is possible to utilize an arrangement in which a control means is incorporated in a thermo-sensitive device itself. Also, such means may be an advanced temperature controlling means utilizing a means such as a controller.

Figure 6:
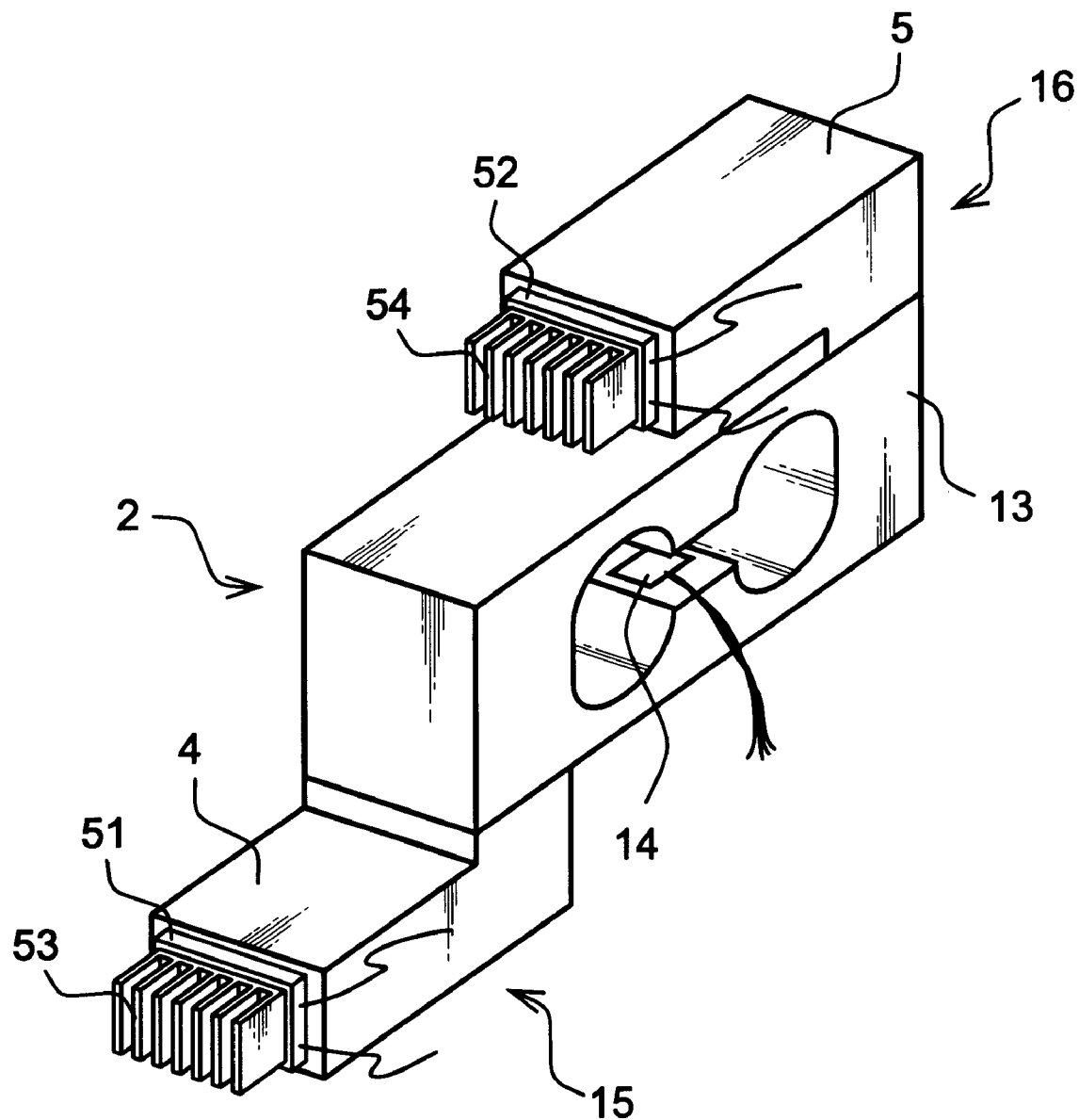
FIG. 6 is a diagram showing an apparatus as an embodiment modified from the first embodiment according to the invention.

Now, an embodiment, as shown in FIG. 6, modified from the first embodiment is explained. The foregoing explanation has covered mainly the arrangements wherein the heaters 8, 9 are used as thermal elements for heating the load cell 2 within the thermal source blocks 15, 16. However, the thermal source blocks 15, 16 are not limited to those which heat the load cell since those which cool the same can also be used. In this case, as shown in FIG. 6, on a surface of the thermally conductive members 4, 5 where the heaters 8, 9 are provided in the first embodiment shown in FIG. 3, Peltier elements 51, 52 which are thermal elements for cooling are provided instead of the heaters 8, 9 which are thermal elements for heating. By providing the Peltier elements 51, 52 on the surface of the thermally conductive members 4, 5 and controlling a cooling temperature of the load cell to a temperature below a range of operating temperatures but below a lower limit of compensating environment temperatures, for example, a temperature in the neighborhood of −10° C., it is possible to eliminate the influence of environment temperature changes to the load cell 2 as in the case where the load cell is heated. On the surfaces opposite to the cooling surfaces of the Peltier elements 51, 52 which are in contact with the thermally conductive members 4, 5, there are respectively provided radiators 53, 54.

The advantages achieved by the invention described above may be summarized as follows:

According to the invention, since the temperature compensation can be effected by making the temperature control of the thermal source blocks provided at the two ends of the load cell, the load cell itself may be that of a conventionally available general type so that the invention can be put in practice at a low cost.

Also, the load cell is in contact only with the thermal source blocks and, since the load cell is separated from other parts such as the mount base and the load detecting plate, the load cell can come in contact only with the ambient air, and this ensures that there is no unbalanced radiation of heat from the deflectable body. Therefore, it is easy to make the temperature control of the load cell.

Further, since the thermal insulating members are provided respectively between one of the thermal source blocks and the fixing member (mounting base) and between the other of the thermal source blocks and the load detecting plate, it is ensured that the thermal source blocks heat only the load cell, resulting in reducing any heat losses and in facilitating the temperature control of the load cell.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A method for effecting temperature compensation in a load cell type load detector formed with a strain gauge attached to a deflectable body, said method comprising the steps of:

providing a pair of thermally conductive thermal source blocks so as to be directly in contact with said deflectable body and be disposed respectively at two symmetric positions with respect to a center of said deflectable body, each of said thermally conductive thermal source blocks having a heat source; and temperature-controlling a temperature of said deflectable body by controlling said heat source in each of said thermal source blocks such that the temperature of said load cell type load detector is not affected by environment temperature changes and is maintained at a constant temperature.

2. The method for effecting temperature compensation in a load cell type load detector according to claim 1, in which said step of temperature-controlling is carried out by a switching action of bimetal switches provided within said thermal source blocks.

3. The method for effecting temperature compensation in a load cell type load detector according to claim 1, in which said step of temperature-controlling is carried out such that the temperature of said load cell type load detector is controlled so as to be above a room temperature but be below an upper limit of a compensating environment temperature of said load cell type load detector.

4. The method for effecting temperature compensation in a load cell type load detector according to claim 1, in which said step of temperature-controlling is carried out such that the temperature of said load cell type load detector is controlled so as to be below a room temperature but be above a lower limit of a compensating environment temperature of said load cell type load detector.

5. An apparatus for effecting temperature compensation in a load cell type load detector in a load detecting apparatus having a mount base, a deflectable body provided on said mount base, a strain gauge attached to said deflectable body, and a load generating section for receiving a load of objects to be measured, said apparatus for effecting temperature compensation comprising:

a pair of thermally conductive thermal source blocks provided so as to be directly in contact with said deflectable body with said thermal source blocks being disposed respectively at two symmetric positions with respect to a center of said deflectable body, and having heat source elements in or on said thermal source blocks;

a pair of temperature sensors provided respectively to said thermal source blocks; and a control means for controlling said heat source elements based on temperatures detected by said temperature sensors such that a temperature of said load cell type load detector may be maintained at a predetermined constant temperature.

6. The apparatus for effecting temperature compensation in a load cell type load detector according to claim 5, in which one of said thermal source blocks is provided between said mount base and said load cell type load detector and the other of said thermal source blocks is provided between said load generating section and said load cell type load detector.

7. The apparatus for effecting temperature compensation in a load cell type load detector according to claim 5, in which said heat source elements comprise heaters for raising a temperature of said load cell type load detector so as to be above a room temperature but be below an upper limit of a compensating environment temperature of said load cell type load detector.

8. The apparatus for effecting temperature compensation in a load cell type load detector according to claim 5, in which said heat source elements comprise Peltier elements for lowering a temperature of said load cell type load detector so as to be below a room temperature but be above a lower limit of a compensating environment temperature of said load cell type load detector.

9. The apparatus for effecting temperature compensation in a load cell type load detector according to claim 5, in which said control means for said temperature sensors comprise bimetal switches.

10. The apparatus for effecting temperature-compensation in a load cell type load detector according to claim 5, in which, between one of said thermal source blocks and said mount base, and between the other of said thermal source blocks and said load generating section, there are respectively provided thermal insulating members.

* * * * *

UNITED STATES PATENT AND TRADEMARK OFFICE
CERTIFICATE OF CORRECTION

PATENT NO. : 6,173,619 B1
DATED : January 16, 2001
INVENTOR(S) : Satoru Satake, Hiroki Maeda Page 1 of 1

It is certified that error appears in the above-identified patent and that said Letters Patent is hereby corrected as shown below:

Column 2,
Line 37, delete -- metric --;
Line 38, delete -- able --;
Line 40, delete -- able --; and Column 3,
Line 1, "call" should be -- cell --;

Signed and Sealed this

Twenty-third Day of October, 2001

Attest:

*Nicholas P. Godici*

NICHOLAS P. GODICI
*Attesting Officer*    *Acting Director of the United States Patent and Trademark Office*